United States Patent [19]

Nance

[11] Patent Number: 4,829,755
[45] Date of Patent: May 16, 1989

[54] TRIMMER WHEELS

[76] Inventor: Nora S. Nance, Rt. 1, Box 239 Legion Dr., Madisonville, Ky. 42431

[21] Appl. No.: 142,496

[22] Filed: Jan. 11, 1988

[51] Int. Cl.⁴ .................................................. A01D 34/67
[52] U.S. Cl. ...................................... 56/17.1; 56/17.5; 56/400.14
[58] Field of Search ............. 56/16.7, 16.9, 17.1, 56/17.2, 17.5, 400.14; 280/43.1; 172/17

[56] References Cited

U.S. PATENT DOCUMENTS

| | | | |
|---|---|---|---|
| 1,338,123 | 4/1920 | Coniglio | 172/17 |
| 2,638,730 | 5/1953 | Davidson | 56/400.14 |
| 2,681,232 | 6/1954 | Womack | 280/43.1 |
| 2,832,184 | 4/1958 | Beverle | 56/17.2 |
| 2,938,323 | 5/1960 | Livingston et al. | 56/17.2 |
| 3,034,275 | 5/1962 | Happe et al. | 56/17.5 |
| 3,774,379 | 11/1973 | Mizobata et al. | 56/10.3 |
| 3,788,049 | 1/1974 | Ehrlich | 56/16.9 |
| 3,977,078 | 8/1976 | Pittinger, Jr. | 56/12.7 |
| 4,127,938 | 12/1978 | Slingerland, Jr. | 56/17.1 |
| 4,224,784 | 9/1980 | Hansen et al. | 56/12.7 |
| 4,287,709 | 9/1981 | Lowry et al. | 56/16.9 |
| 4,321,785 | 3/1982 | Kaland | 56/17.2 |
| 4,358,123 | 11/1982 | Richards | 56/400.14 |
| 4,364,435 | 12/1982 | Tuggle et al. | 56/17.2 |
| 4,389,836 | 6/1983 | Lowry et al. | 56/12.7 |
| 4,411,126 | 10/1983 | Lowry et al. | 56/17.5 |
| 4,442,659 | 4/1984 | Enbusk | 56/12.7 |
| 4,512,143 | 4/1985 | Jimenez | 56/16.7 |
| 4,531,350 | 7/1985 | Huthmacher | 172/17 |
| 4,587,800 | 5/1986 | Jimenez | 56/16.9 |
| 4,689,941 | 9/1987 | Doering | 56/17.2 |

*Primary Examiner*—Paul J. Hirsch
*Attorney, Agent, or Firm*—Cohn, Powell & Hind

[57] ABSTRACT

This invention provides an apparatus to support a trimmer used in cutting weeds or grass in a generally horizontal mode and having an elongate tubular member providing a handle. The support apparatus includes a mounting assembly having opposed ends, one of said ends being connected to the tubular member in height-adjustable and angularly-adjustable relation and the other of said ends being connected to a pair of ground wheels having an axis of rotation transverse to the axis of the cutting plane of the trimmer.

3 Claims, 1 Drawing Sheet

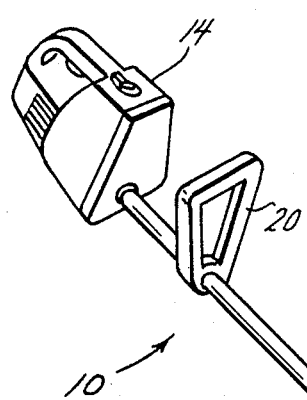
FIG. 1.
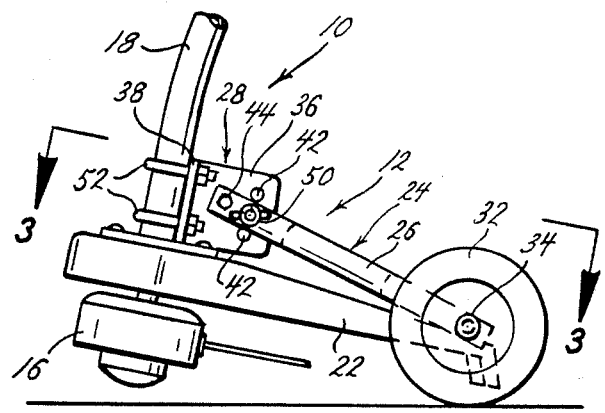
FIG. 2.
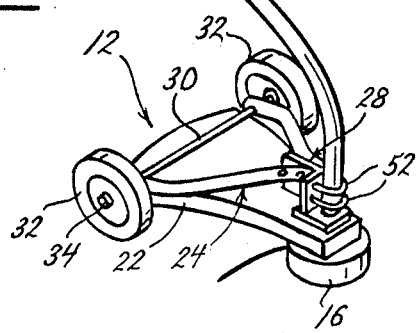
FIG. 3.
FIG. 4.

TRIMMER WHEELS

BACKGROUND OF THE INVENTION

This invention relates generally to trimmers used to cut weeds or grass by means of a cutting line or saw blade and particularly to a support apparatus for carrying the weight of the trimmer.

Trimmer machines cause a variety of problems for the user by the mere fact that they must be manually held above the ground with considerable physical discomfort to the user. The user suffers muscle strain from both the weight and the vibration of the machine. Another problem results from the inability of the user to blend the trimmed grass with the height of the lawnmower cut grass which is due to the difficulty involved with physically controlling the trimmer. Also, it is not easy, without support, to maneuver the trimmer around bushes, trees, lawn furniture and other obstacles.

Although support devices for trimmer machines are known in the prior art they do not seem to solve these problems. One such device, disclosed in U.S. Pat. No. 4,224,784 (Hansen) has wheels oriented for sideways movement and is used to support a trimmer in a vertical mode so that it can be used as an edge trimmer. Another device disclosed in U.S. Pat. No. 4,442,659 (Enbusk) which takes the form of a two wheel dolly having a pivot connection for the shaft housing of a trimmer to permit rotation from horizontal to vertical action with this device it is necessary for the user to work with two handles.

The present trimmer support apparatus overcomes these problems in a manner not disclosed in the known prior art.

SUMMARY OF THE INVENTION

This invention provides a support apparatus for a trimmer which includes a universal mounting frame having a pair of wheels attached which provides stability, support and maneuverability for a standard lawn and weed trimmer.

It is an aspect of this invention to transfer trimmer vibration and weight into the ground to reduce operator discomfort.

Another aspect of this invention is to provide additional operator control by enabling the operator to position his feet a greater distance away from the trimmer.

A further aspect of this invention is to enable the operator to blend grass heights, due to increased control over the trimmer.

It is another aspect of this invention to have one mounting bracket which adapts to a number of commercially available trimmers by proper positioning on the elongate trimmer handle.

Another aspect is to provide height adjustment to adapt to the height of the operator.

This combination trimmer and support apparatus includes a trimmer having means providing a substantially horizontal cutting plane and an elongated handle means and a support apparatus for the trimmer, the support apparatus including mounting means having opposed ends, means for connecting one end of said mounting means to the handle means, the handle means providing the sole handle for the support apparatus; ground engaging wheel means, including shaft means; and means for connecting the other end of the mounting means to said shaft means, the rotational plane of said ground wheels being transverse to the cutting plane of the trimmer.

It is an aspect of this invention to provide that the mounting means includes a mounting bracket and a frame extending between the shaft means and the mounting bracket the frame being connected to the mounting bracket in adjustable relation.

It is another aspect of this invention to provide that the mounting bracket includes a pivot opening and a pivot fastener received by the opening and connecting the frame to the mounting bracket, said mounting bracket including a plurality of adjustment openings and a fastener selectively connecting the frame to the mounting bracket to adjust the angle of the trimmer handle means.

Yet another aspect of this invention is to provide that the trimmer handle means includes an elongate tubular member providing a handle and having a hand grip, the tubular member being connected to the mounting bracket in height-adjustable relation.

Still another aspect of this invention is to provide that the mounting bracket includes opposed pairs of openings and a pair of U-bolts disposed about said handle tubular member in clampable relation to provide the height adjustment.

It is an aspect of this invention to provide a support apparatus which can be readily and conveniently attached to virtually any trimmer and which is inexpensive and easy to use.

BRIEF DESCRIPTION OF THE DRAWINGS

FIG. 1 is a perspective view of gas powered trimmer and support apparatus assembly;

FIG. 2 is a side elevational view of the support apparatus and trimmer of FIG. 1;

FIG. 3 is a top plan view of support apparatus only of FIG. 1, and

FIG. 4 is a side elevational view of the support apparatus used with an electric powered trimmer.

DESCRIPTION OF THE PREFERRED EMBODIMENT

Referring now by reference numerals to the drawings and first to FIGS. 1 and 2 it will be understood that a conventional line trimmer 10 is carried by a support apparatus or assembly generally indicated by numeral 12.

More specifically, the trimmer 10 includes a gas powered motor unit 14 and a line head unit 16 interconnected to said motor unit by an elongate tubular handle member 18 which, in the preferred embodiment shown, provides a drive shaft housing. A handgrip 20 is provided on said handle member and said handgrip and said handle member cooperate to provide a handle means. A rearwardly extending trimmer guard 22 is provided which is connected to the lower end of the handle member 18.

The support apparatus 12 includes a frame assembly 24, constituting a mounting means, and consisting of a pair of tubular members 26 and a universal mounting bracket 28 to which said members 26 are connected at their inner end. The frame members 26 are apertured at their outer end to receive a shaft 30 carrying ground wheels 32 which are held in place by cap nuts 34.

As shown in FIG. 3 the mounting bracket 28 is generally T-shaped to include a stem member 36 and a cross member 38. The stem member 36 includes a pivot opening 40 and a plurality of adjustment openings 42, three (3) in number in the preferred embodiment, said openings 42 being disposed on an arcuate line radially equidistant from the pivot opening 40. The forked tubular members 26 are apertured at two spaced locations to receive a pivot bolt 44 and an adjustment bolt 46. Said tubular members are connected to said mounting bracket by the pivot bolt 44 and the adjustment bolt 46 by means of nut 48 and wing nut 50 respectively. It will be understood that if desired an arcuate slot could be provided in lieu of individual adjustment openings 42.

The trimmer 10 is connected to the mounting bracket 28 by means of two (2) U-bolts 52 received by openings 54 provided in the cross member 38. The handle member 18 is held in clamped adjustable relation against the front face of the mounting bracket cross member 38 by means of the U-bolt 52 and nuts 56.

As will be readily understood the trimmer handle member 18 and handgrip 20 provides a convenient push handle by which the trimmer may be controlled during operation. The trimmer 10 can be moved from the position shown in FIG. 1 by simply lowering the handle so that the support apparatus 12 pivots about the ground wheels 32 to the desired work position comfortable to the operator. Height adjustment can be made by adjustment of the U-bolts 52 and angle adjustment can be made by pivoting the tubular members 26 about the pivot bolt 44 and selecting an appropriate opening 42 for the adjustment bolt 46. Because of the height and angle adjustment capability the user is easily able to control the trimming height and to move more readily around obstructions such as shrubs and lawn furniture.

Further, the provision of the support apparatus 12 provides that the weight of the trimmer 10 and the vibration from the trimmer are transferred to the ground which relieves the operator from considerable fatigue.

As will be readily understood from FIG. 4, the support apparatus 12 can be used for an electric powered trimmer indicated by 10A as a second embodiment. With this trimmer the motor unit 14A having a line head unit 16A and a guard 22A is disposed at the lower end of the elongate tubular handle member 18A which provides a conduit or housing for the electrical cable 19A supplying power to the motor unit 14A. In other respects the combination is substantially the same as that described above with respect to the trimmer 10 it being understood that a similar handgrip (not shown) is generally attached to the handle member 18A.

Having described the invention in detail, those skilled in the art will appreciate that modifications may be made without departing from its spirit. Therefore, it is not intended that the scope of the invention be limited to the specific embodiments illustrated and described. Rather, it is intended that the scope of this invention be determined by the appended claims and their equivalents.

I claim as my invention:

1. A combination trimmer and support apparatus, comprising:
    (a) a trimmer including means providing a substantially horizontal cutting plane and an elongate handle means,
    (b) a support means for the trimmer including:
        1. an elongate rearwardly extending mounting frame having a narrow front end and a relatively wide rear end providing spaced support points,
        2. a mounting bracket connecting the front end of the mounting frame to the trimmer handle means in height adjustable and angle adjustable relation, and
        3. a pair only of ground engaging wheels including shaft means attaching each of said wheels to one of said mounting frame support points rearwardly of the horizontal cutting plane, the rotational plane of the ground wheels being transverse to the cutting plane of the trimmer, and
    (c) the trimmer handle means providing the sole handle for the combination trimmer and support apparatus.

2. A combination trimmer and support apparatus as defined in claim 1, in which:
    (d) said mounting bracket includes a pivot opening and a pivot fastener received by said opening and connecting said frame to said mounting bracket, and a plurality of adjustment openings and a fastener selectively connecting said frame to said mounting bracket in angularly adjustable relation.

3. A combination trimmer and support apparatus as defined in claim 1, in which:
    (d) the trimmer handle means includes an elongate tubular member,
    (e) the mounting bracket including a pair of forked tubular frame members,
    (f) said mounting bracket is substantially T-shaped to include a stem and a cross member, said stem including a pivot opening and a plurality of adjustment openings and a pivot fastener connecting said frame members to said stem, and an adjustment fastener selectively connecting said frame members to said stem in angularly adjustable relation, and said cross member includes opposed pairs of openings and a pair of U-bolts disposed about said tubular member in clampable relation to provide height adjustable relation.

* * * * *